(12) United States Patent
Pellegrini

(10) Patent No.: US 7,356,508 B2
(45) Date of Patent: Apr. 8, 2008

(54) SYSTEM THAT TRANSFERS ASSET OWNERSHIP USING A PROBABILISTIC MODEL

(76) Inventor: Dante Pellegrini, 1430 Audubon Ave. (P.O. Box 1387), Montara, CA (US) 94037

( * ) Notice: Subject to any disclaimer, the term of this patent is extended or adjusted under 35 U.S.C. 154(b) by 1347 days.

(21) Appl. No.: 09/736,134

(22) Filed: Dec. 15, 2000

(65) Prior Publication Data

US 2002/0077982 A1    Jun. 20, 2002

(51) Int. Cl.
*G06Q 40/00*    (2006.01)
(52) U.S. Cl. ........................................ 705/41
(58) Field of Classification Search .................. 705/41
See application file for complete search history.

(56) References Cited

U.S. PATENT DOCUMENTS 5,537,314 A * 7/1996 Kanter ........................ 705/14
6,966,836 B1 * 11/2005 Rush et al. ................... 463/28

OTHER PUBLICATIONS

Walker, Leslie. Where You Can Get Rich Click. The Washington Post. Washington, DC. Nov. 18, 1999. p. E01.*

* cited by examiner

*Primary Examiner*—James A. Kramer
*Assistant Examiner*—Jason Borlinghaus
(74) *Attorney, Agent, or Firm*—Venable LLP; Robert Babayi

(57) ABSTRACT

Briefly, according to the present invention, ownership right in an asset is transferred using a probabilistic model. In one exemplary embodiment, the system and method of the invention implements the probabilistic model by a raffle system that facilitates the transfer of ownership in any asset. An asset can be any valuable item that is owned, including any type of product, good or service. In an exemplary embodiment, the participants interface with the system over a network of interconnected wired or wireless devices, such as the Internet.

23 Claims, 4 Drawing Sheets

SYSTEM THAT TRANSFERS ASSET OWNERSHIP USING A PROBABILISTIC MODEL

BACKGROUND OF THE INVENTION

Various mechanisms for transfer of ownership between a buyer and seller include in-kind exchanges, trading, bartering, direct selling and auctioning. However, with the advent of the Internet and the development of new marketing systems, the world of commerce has changed dramatically for small and large companies as well as individual entrepreneurs. The Internet offers buyers and sellers a global marketplace in which they may actively participate in the transfer of ownership of any asset. As a result of the proliferation of on-line sales thru the Internet, doing business is being profoundly impacted through such means as easily attained affiliations with other business entities over the Internet. For example, an individual entrepreneur can quickly open an online super mall on the Internet, with little to no investment, save for the time to get a web site up and running.

While some electronic commerce have adopted conventional brick-and-mortar models, other businesses; such as E-bay, Priceline, and Mercata have devised new business models for transacting business over the Internet. For example, E-bay offers a Consumer-to-Consumer (C2C) model to buyers and sellers over the Internet. The E-bay model facilitates transfer of ownership through various "auction" models, such as standard auctions, reverse auctions, and Dutch auctions. Generally, consumer sellers post items on an E-bay administered system, which offers a web-site that allows consumer buyers to log on search (browse) for various auctioned items. The E-bay system allows sellers to post a description and picture of the auctioned items on the web site. The system then schedules auctions for the items and presents the forum for accepting bids. The consumer buyers, which can search for the auctioned items by categories or other criteria, e.g., manufacturer, etc., place bids for specific auction items during specified auction periods. While the auction is in progress, the system allows the buyers and sellers to view the bids. The bidders are also given the opportunity to increase their bids during the process. At the end of the timed auction, the highest bidders are given the right to purchase the auctioned items for corresponding bid amounts.

Under the e-bay model, the sellers receive the highest bid amount minus a commission that ranges between 1%-6% of the sale price. The buyers pay cash considerations to the sellers. It has been observed that the E-bay model works better with lower priced items than higher prices items, primarily because the consumer demand for auctions reduces as the price of the auctioned items increases.

Mercata offers a Business-to-Consumer (B2C) model that aggregates consumer buyers who wish to purchase goods or services form sellers, which are primarily such businesses as distributors, manufacturers, or service providers. This model takes advantage of the aggregate buying power of pools of buyers to reduce purchase price. In addition to buyers, the aggregate model has also been applied to pools of sellers. Therefore, aggregators, such as Mercata, facilitate the transfer of ownership through aggregate buying or aggregate selling. The more aggregate participants, i.e., buyers or sellers, the lower is the purchase or sales prices become. However, under this model, the consumer buyers generally pay near the fall value of the goods or services.

Priceline also offers a Business-to-Consumer (B2C) model over the Internet. The Priceline model facilitates the transfer of ownership through a model that has become known as "Name Your Price." Essentially, this model offers certain categories of goods or services, e.g., airline tickets, to buyers from seller who sell excess inventory for less than retail price.

However, there still exists a need for a system that can utilize the Internet for other types of sale transactions or promotional purposes.

SUMMARY OF THE PRESENT INVENTION

Briefly, according to the present invention, ownership right in an asset is transferred using a probabilistic model. In one exemplary embodiment, the system and method of the invention implements the probabilistic model by a raffle system that facilitates the transfer of ownership in any asset. An asset can be any valuable item that is owned, including any type of product, good or service. In an exemplary embodiment, the participants interface with the system over a network of interconnected wired or wireless devices, such as the Internet.

More specifically, the present invention issues redeemable tokens having defined redemption values to one or more participants over the network. Each issued redeemable token is associated with a participant. When the redemption value of the issued redeemable tokens reaches a collective token value, the present invention probabilistically selects at least one redeemable token. The collective token value can be a pre-defined value, a value reached after a predefined time period, or a value reached after a predefined number of redeemable tokens are issued. An ownership right, full or partial, to an asset, which can be pledged or for sale, is then transferred to a participant who is associated with a probabilistically selected redeemable token.

According to some of the more detailed features of the invention, a redemption value is specified for the asset, with the redemption value corresponding to the collective token value of the issued redeemable tokens. For example, the redemption value of the asset can be equal to the collective token value of the issued redeemable tokens. Thus, the redeemable token is probabilistically selected, when the collective token value of the issued redeemable tokens reaches the redemption value of the asset.

According to other more detailed features of the invention, a seller can offer an asset to participating buyers over the network by specifying a redemption value for the asset. The redeemable tokens can be issued in response to buyer participants purchasing one or more redeemable tokens. Under this embodiment, the ownership right to the asset that is for sale is transferred to a buyer participant who is associated with a probabilistically selected redeemable token.

Under another embodiment of the present invention, the asset can be a promotional item, for example one, pledged by a promoter. The promotional item can be offered over the network, whereby participants who meet an incentive criterion set forth by the promoter are issued redeemable tokens. For example, the redeemable tokens can be issued in response to participants browsing one or more web pages of the promoter over the network. Under this arrangement, the ownership right to the promotional item is transferred to a participant who is associated with a probabilistically selected redeemable token.

DESCRIPTION OF THE PRESENT INVENTION

Figure 1:
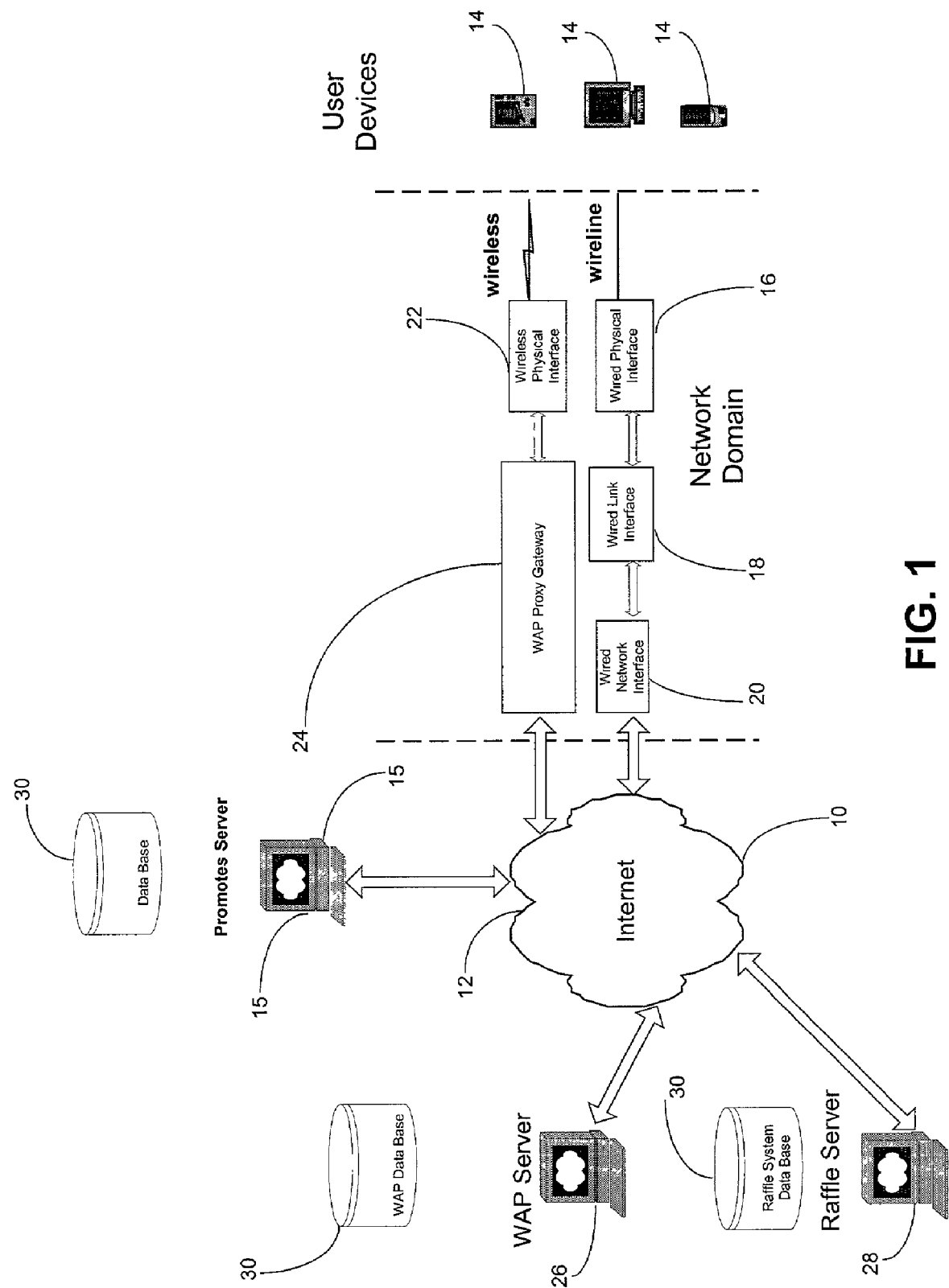
FIG. 1 is a block diagram of a system that advantageously uses the present invention.

Referring to FIG. 1, a system 10 that advantageously implements the present invention is shown. The system of the invention is preferably implemented over a communication network 12 that provides wired or wireless links with user-devices 14. As such, the user-devices 14 can be wired or wireless devices. The user-devices 14 may include personal computers, handheld communication devices, or any other devices capable of communicating information within over the network 12. Preferably, the user-devices 14 include a visual display for providing a visual interface with a user. However, the user-devices 14 are also capable of communicating information in any form, including audion and video form, or in any other form conceivable by one skilled in the art.

Preferably, the system 10 uses a Web client/server model that allows a participant to use applications hosted on remote servers that serve content to the user devices 14. Under this arrangement, the user-devices 14 execute client applications, such as web browsers, to communicate with the remote servers. This client/server model can be extended to any user-device that is capable of accessing a computer network. Under the present invention, a user devices 14 can include any client device that is used by any participant involved in a web related activity, including for browsing the web a for buying or selling goods or services, etc. Examples of wired devices include personal computers, mobile computers, notebooks, workstations, etc. that for example, operate using an operating system, such as Windows, Mac OS operating systems. Examples of wireless devices include personal digital assistant (PDAs) that operate under one of well-known operating systems, such as Palm OS or Windows CE.

The wired devices connect to the network 12 via a wired physical interface 16, a wired link interface 18 and a wired network interface 20. For the wired devices, examples of network communication standards include the well-known Ethernet and TCP/IP protocols. The wireless devices connect to the Internet via a wireless physical interface 22. The invention can use a Wireless Application Protocol (WAP). The WAP environment generally consists of the following elements: a WAP client device, a WAP Proxy/gateway 24, and a WAP server 26. Many different wireless devices can operate as a WAP Client, including but not limited to mobile phones and Personal Digital Assistants (PDA's). Various wireless links that support defined protocols may be used. Examples of such protocols include GSM, IS-136, IS-95, Bluetooth, iDEN, Flex, ReFlex, etc.

In one exemplary embodiment, the network 12 comprises the Internet. As is known, Internet is a distributed network that supports the World Wide Web ("Web"). The Web refers generally to both (i) a distributed collection of inter-linked, user-viewable hypertext documents (commonly referred to as Web documents or Web pages) that are accessible via the Internet, and (ii) the user and server software components which provide user access to such documents using standardized Internet protocols. Currently, the primary standard protocol for allowing applications to locate and acquire Web documents is HTTP, and the Web pages are encoded using HTML. WML is the markup language used for by wireless application protocols, such as that specified by WAP. WAP is an XML-defined markup language similar to the HTML standard used on the Internet today. The WAP standard also includes a scripting language similar to JavaScript, but is optimized for WAP clients.

The terms "Web" and "World Wide Web" encompass future markup languages and transport protocols which may be used in place of (or in addition to) HTML, WML, XML, WAP and HTTP or any other presently known or later developed browser-based user interfaces. The present invention can also operate on internal networks (Intranets) and networks utilizing different communication protocols. The Intranet model is typically used internally by companies to allow employee access to company information.

A Web Site is provided by a Web server 15 that serves content over the network 12 using the standard protocols of the World Wide Web. Typically, a Web site corresponds to a particular Internet domain name and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. As shown, each server, can access corresponding databases 30 for serving information and content.

Under the present invention, participants use the user devices 14 to participate in transactions that result in transfer of ownership rights on various types of assets that are owned. For example, the assets can be any type of goods or services. For transfer of ownership rights, the system 10 of the invention uses a probabilistic model that is implemented over a web-based raffle system. The system 10 includes a central processing raffle server 28 that serves information and content to the user devices 14 over the network 12. The raffle server 28 executes a token redemption application program that issues redeemable tokens having defined redemption values. The tokens are associated with the participants. In one exemplary embodiment, using the tokens, the participants can be buyers who purchase an asset using the probabilistic model of the invention.

According to another aspect of the invention, the raffle server 28 can communicate with the remote server 15, which may be, for example, a server owned by a promoter for promoting goods and services in accordance with the present invention. In another exemplary embodiment, the participants can participate in transactions for pledged assets by the promoter. Promoter pledging the asset specifies an incentive criterion for issuing redeemable tokens to participants who meet the incentive criterion. When the redemption value of the issued tokens reaches a collective token value, the present invention selects one or more tokens. The ownership right of the pledged asset is transferred to a participant that is associated with a selected token.

Figure 2:
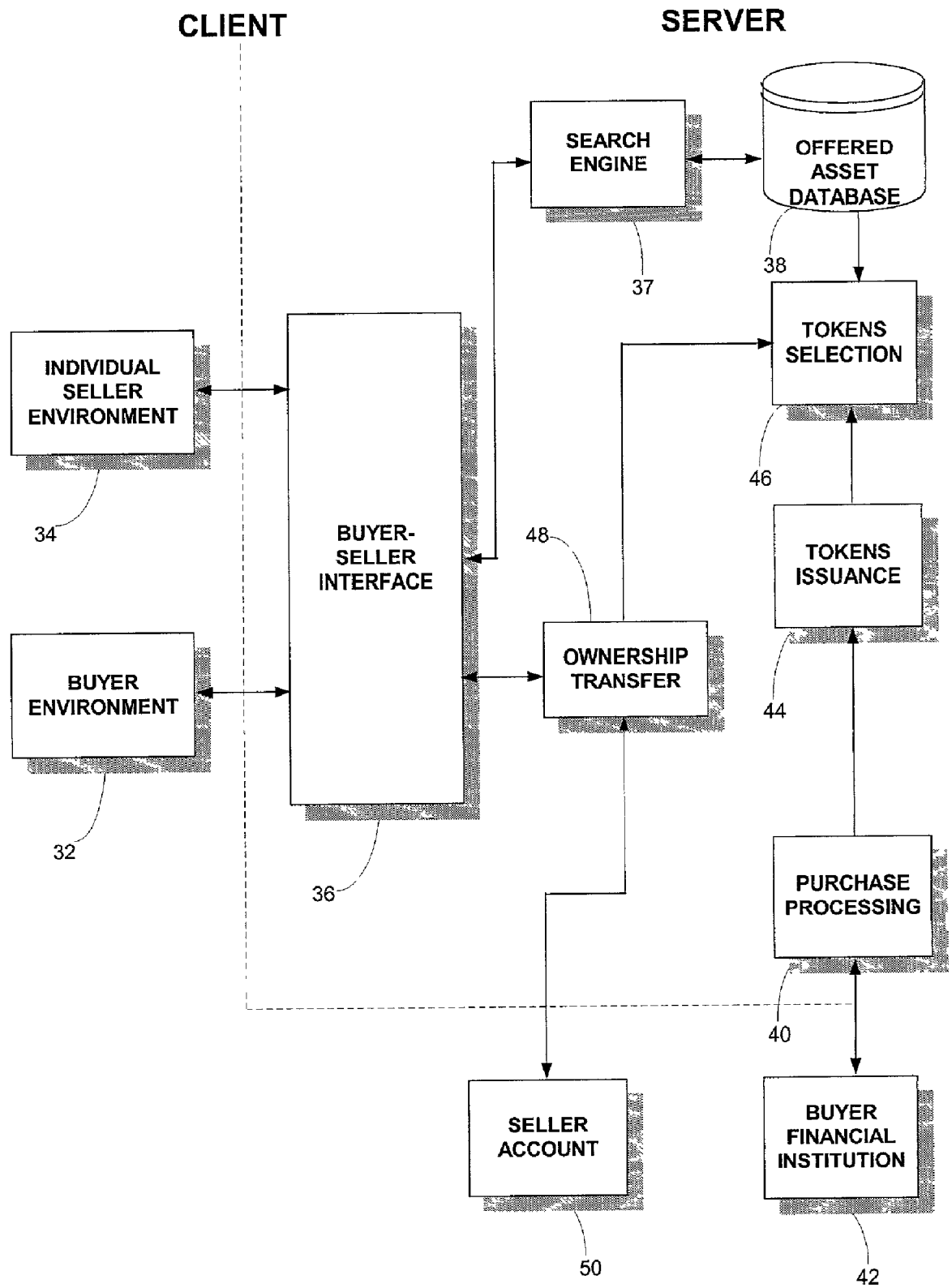
FIG. 2 is a logical block diagram of a server-client model used to implement one aspect of the present invention.

Referring to FIG. 2, a logical block diagram of a server-client model used to implement one aspect of the present invention is shown. This aspect of the invention relates to transfer of ownership in a purchase-sale transaction. On the client side, i.e., the present invention creates buyer or seller environments that are presented to buyer and seller participants in user-devices 14. That is, on the buyer user-device, the present invention creates a buyer environment 32 that is used by a buyer environment 32 to participate in the purchase of an offered asset over the network. On the seller side, the present invention creates a seller environment 34 that allows a seller to offer assets for sale over the network 12 using a seller user-device 14. The buyer and seller environments 32 and 34 can be created on the user devices utilizing many methods. For example, in a thin client model, each user-device can execute a browser application such as Internet Explorer or Netscape, to connect to web pages that are served by the raffle server 28. The raffle server 28 then serves web pages that create the buyer and seller environments on the buyer and seller user-devices, respectively. Alternatively, the buyer and seller environments can be created by executing suitably written application programs on the user devices 14 which may, for example, be downloaded from the raffle server 28.

The raffle server 28 also executes a buyer-seller interface 36 that allows the buyers and sellers to communicate (i.e., receive or transmit) information over the network 12. In this way, a seller of an offered asset can enter related information to the asset for storage in an offered asset database 38 that is accessible by the raffle server 28 (shown in FIG. 1). At a minimum, the offered asset information can include a description of the offered asset and a value associated with the asset. The value associated with the asset can for example correspond to an offered price for the asset. Various sellers, such as individuals, distributors, or manufacturers can participate as sellers in the system of the present invention.

The buyers can then search the offered asset database 38 to select a desired item for purchase. The assets may be categorized based on product type, model, manufacturers, etc. Therefore, the search criteria for selecting an asset can be based on any parameter that identifies an offered asset. A search engine 37 can be used for facilitating the search of the offered assets by the buyer where a list of the items that meet the search criteria specified by the buyer are displayed.

Once the buyer selects an offered asset, tokens having defined redemption values can be purchased. Using the buyer seller interface 36, the buyers can enter their credit card number and other related information for purchasing a specified amount of tokens. A purchase processing application interfaces with a buyer financial institution 42 to receive authorization for the specified purchase amount. Once approved the purchase processing application 40 then signals a token issuance application 44 to issues a corresponding number of tokens to the buyer. Each issued token has an identification parameter that associates it with the buyer. The identification parameter can be associated with the buyer in using any number of techniques, including a pseudo-random technique, serially, sequentially or in any order that satisfies an association criterion. Multiple buyers can participate in the purchase of an offered asset by themselves purchasing additional tokens.

Once a collective token value has reached, the raffle server executes a token selection application 46 that selects a token based on a probabilistic model, for example, randomly. The collective token value can correspond to a value that is specified by the seller for the offered asset. For example, the seller can specify $100 for an offered asset. The present invention then issues tokens, which have predefined redemption values. The redemption value of the tokens can be any amount or denominations that is specified by the system or the seller. For example, the system can issue tokens having $1, $2, $5, $10 redemption values or any other denomination. The seller can also specify the denomination for each issued token. For example, the seller can specify that for the $100 asset, the tokens issued would have $5 denominations. In this way, if 20 tokens have been purchased by the buyers, the token selection application can be executed to select a token that is associated with a buyer.

The selection process is probabilistic and can be based on various models, such as randomly, quasi-randomly, or pseudo-randomly. An ownership transfer application 48 then transfers the ownership of the offered asset to the buyer that is associated with the selected token. The transfer of ownership can be accomplished contractually based on a prescribed agreement that is presented to the seller when he offers the asset for sale over the network. For example, the seller agrees to transfer the ownership of the offered asset to the holder of a selected token. Once the ownership is transferred to a selected buyer, the ownership transfer application 48 then deposits the purchase amount less a prescribed service fee to the seller account 50. If applicable, various methods for transfer of the asset to the buyer can be used. For example, the seller can ship the offered asset to the purchaser directly or through a third party trustee that would hold the asset in trust until the ownership right is determined.

Of course, the seller environment in the user device 14 does not necessarily have to be created when a manufacturer agrees to offer assets for sale over a web page that is presented to the buyers by the raffle server 28. For example, a manufacturer can agree to sell its inventory, e.g., surplus inventory, using the present invention by specifying values associated with each one of the offered assets in the surplus inventory. The purchasers can then be presented with the offered assets from the manufacturer and be given an opportunity to purchase the assets based on the probabilistic model of the present invention. Under this arrangement, the manufacturer can also specify the token redemption values for the buyers of the offered assets.

Figure 3:
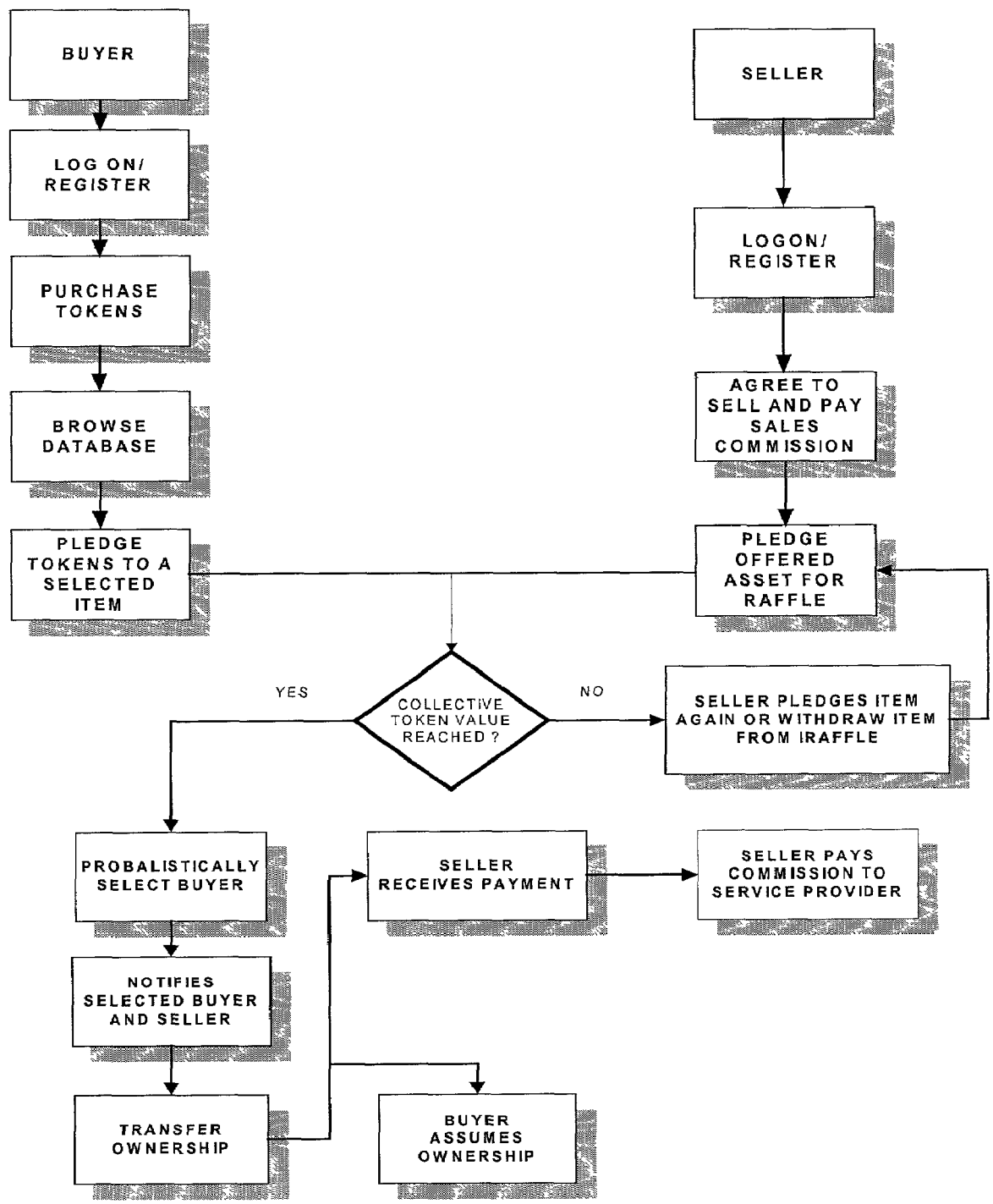
FIG. 3 is a flow char of a method for transferring asset in accordance with an exemplary embodiment of the invention.

Referring to FIG. 3 flowchart for transferring ownership of an asset under a purchase-sale transaction in accordance to the present invention is shown. On the Buyer's side, a Buyer logs on and registers with the system, and on the Seller side, a Seller logs on and registers with the system. The buyer and seller log on and register with the system using the buyer seller interface 36, as shown in FIG. 2. During registration, the Seller agrees to transfer ownership of an offered asset to a Buyer selected in accordance with the raffle system of the present invention. The Seller also agrees to pay a specified sales commission to the raffle-service-provider. By entering an offered asset into the offered asset database 38 (shown in FIG. 2), the Seller pledges the asset for raffling purpose.

Once registered, the Buyer purchases tokens, for example, via a credit card or other means that satisfy the requirements for purchasing the tokens. The Buyer then browses the offered asset database 38 to select an offered asset for purchase. The Buyer then pledges the purchased tokens toward the selected asset.

After a predetermined time raffled period, a determination is made as to whether the collective token value is reached or not. If the token value is reached, the system of the invention probabilistically selects a Buyer by selecting a purchased token that is associated with the Buyer. Then the selected Buyer and the Seller are notified of the raffle result and the ownership in the offered asset is transferred to the Buyer, when the Buyer assumes ownership. The Seller receives payment and pays commission to the service provider. If, however, after the time raffle period, the collective token value is not reached, the tokens are refunded to the Buyer's account. The Seller can pledge the offered asset again or withdraw it from raffle.

Figure 4:
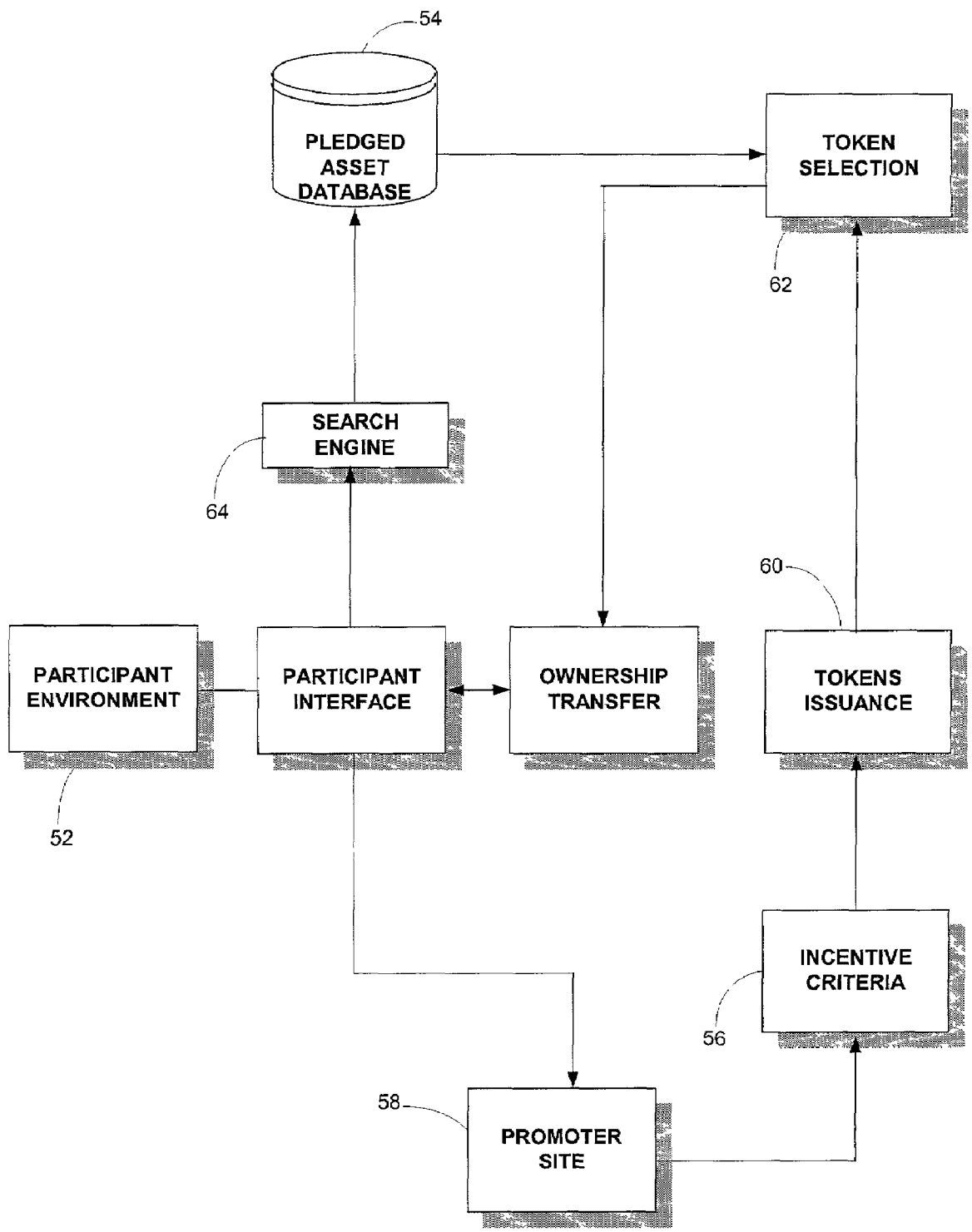
FIG. 4 is a logical block diagram of a server-client model used to implement one aspect of the present invention.

Referring to FIG. 4, a logical block diagram of a client server model that implements another aspect of the present invention is shown. Under this embodiment, the present invention allows promoters of goods or services to engage participants in promotional activities. The promotional activities are associated with one or more incentive criteria. When a participant satisfies an incentive criterion, the present invention issues a predefined number of tokens. Under this arrangement, a participant environment 52 is created on a user device 14 that is used by the participant to engage in the promotional activity. The participant environment 52 may be created by a promoter web site 15 or by the raffle server 28 (both shown in FIG. 1). In any event, the promoter specifies the incentive criteria. The incentive criteria that may for example correspond to a predefined number of web pages visited or searched or any other criteria that is specifiable by the promoter for issuing tokens in accordance with the present invention. A pledged asset database 54 stores asset information related to the assets that are pledged by the promoter in connection with the promotional activity. An incentive criteria application 56 receives information from a promoter site 58 as to whether an incentive criterion has been satisfied. Alternatively, the raffle server itself may be enabled to determine whether any incentive criterion is satisfied. The incentive criteria satisfaction information may, for example, indicate the number of tokens to be issued to the participants. A token issuance application 60 is responsible for issuing the tokens in response to the indication from the incentive criteria application 56. Once the collective value of the issued tokens reaches a collective token value the present invention executes a token selection application 62 whereby a token that is associated with a participant is selected based on the probabilistic model of the invention. Once a token is selected, the system of the present invention then transfers the ownership of the pledged asset to the participant that holds the selected token.

Using a search engine 64, participant can also search for a particular pledged asset that is stored in the pledged asset database 54. For example, the promoter may allow participants to select a pledged asset that is stored in the pledged asset database 54 before starting the promotional activity. Once a consumer selects a pledged asset, the participant can then engage in the activity that is specified by the promoter to meet the incentive criteria.

From the foregoing, it would be appreciated that the present invention can be used to create a raffle environment for engaging in ownership transfer transactions in accordance with the present invention. For example, such environment can be created via one or more web pages that are served by a raffle system server, for purchasing raffled items such as Real Estate, Travel service, Jewelry, Collectibles, Automobiles, Boats, Airplanes, Electronics devices, etc. The raffle environment of the invention allows buyers to purchase tokens for the chance of gaining ownership of the raffled items.

In operation, the participants visit a raffle website and are invited to register as a member. The user agrees to the terms and conditions of membership by filling out an application containing necessary personal information. During the registration process the participant can charge a desired amount for purchasing tokens to a credit card. The participant can then browse from a menu of raffle items, to choose one or more raffled items. Other participants can also purchase tokens for the raffled items. Obviously, a participant who purchases a greater number of tokens has a better chance of winning the raffled item.

In another embodiment, the consumers are allowed to browse sponsoring promoter web sites and receive promotional raffle tokens for visiting the web sites. Under this arrangement, third party web-sites can attract and entice users to their site by offering free raffle entries. Participants can log on to the third party website and participate in browsing and searching the site for which they earn tokens. The raffle entries can be accepted by the third-party websites via a suitably developed software application. In this way, the third-party web sites can create traffic on their sites without taking in any monetary considerations from users. The raffle tokens can also be redeemed by participating vendors.

For example, an auto manufacturer can present flagship cars on its site and invite users to register, browse and search the site. For every page that the participant views and interacts with, the participant can receive a raffle token for the flagship car. All the entries are recorded in the participant's user file. At predefined intervals, e.g., at the end of each month one or more, tokens are randomly selected from the total number of entries and one of the site visitors holding the selected token can assume ownership of the given asset.

The present invention can also be applied to a business consumer (B2C) model. Utilizing the probabilistic transfer of ownership in assets, the present invention can, provide a forum for consumer goods companies to sell their products. As such, the present invention presents these companies with an alternative distribution channel. This would be attractive to companies with excess inventory.

In yet another exemplary embodiment, the present invention can offer users the opportunity to browse through categories of items in which they may enter into a raffle to win the item. The system can then offer the participants who did not win the raffle item another online destination to find the raffled item, for example by issuing a coupon that may identify the user. In this way, the present invention can be used as a category portal, with an e-commerce infrastructure to track participants, viewing patterns, and online purchases.

The invention claimed is:

1. A method for transferring ownership of an asset, comprising the steps of:
    issuing tokens having pre-defined values to one or more participants over a network, wherein the participants interface with the network using wired or wireless devices, and wherein each issued token is associated with a participant;
    probabilistically selecting at least one token upon or after the total cumulative value of the issued tokens reaches a predefined cumulative value; and
    transferring the ownership right to the asset to a participant who is associated with the selected token.

2. The method of claim 1 further including the step of:
    specifying an asset value for the asset that corresponds to the predefined cumulative value.

3. The method of claim 1, wherein the asset value for the asset is equal to the predefined cumulative value.

4. The method of claim 1, wherein the tokens are issued in response to a participant purchasing the tokens for a specified price.

5. The method of claim 1, wherein the tokens are issued in response to a participant meeting an incentive criterion.

6. The method of claim 5, wherein the incentive criterion requires browsing one or more web pages.

7. The method of claim 1 further including the steps of:
offering the asset for sale over the network by specifying an asset value; and
transferring the ownership right to the asset to a buyer participant who is associated with the selected token.

8. The method of claim 1 further including the steps of:
offering the asset as a promotional item by specifying a corresponding incentive criterion for the promotional item;
issuing tokens to participants that meet the incentive criterion; and
transferring the ownership right to the promotional item to a participant who is associated with the probabilistically selected token.

9. The method of claim , wherein the predefined cumulative value is at least one of a value reached after a predefined time period or a value reached after a predefined number of tokens are issued.

10. A method for transferring ownership of an asset to participants over a network comprising the steps of:
offering the asset for sale by specifying an asset value associated with the asset;
issuing tokens having pre-defined values to one or more buyer participants who purchase the tokens, wherein each issued token is associated with a buyer participant, and wherein the participants interface with the network using wired or wireless devices;
probabilistically selecting at least one token, when the total cumulative value of the issued tokens reaches the asset value; and
transferring the ownership right to the asset to a buyer participant who is associated with the selected token.

11. A method for transferring ownership of an asset to participants over a network comprising the steps of:
offering the asset as a promotional item;
associating the promotional item with an incentive criterion;
issuing tokens having pre-defined values to one or more participants who meet the incentive criterion, wherein each issued token is associated with a participant, and wherein the participants interface with the network using wired or wireless devices;
probabilistically selecting at least one token, when the total cumulative value of the issued tokens reaches a predefined cumulative value; and
transferring the ownership right to the asset to a participant who is associated with the selected token.

12. The method of claim 11, wherein the incentive criteria requires browsing one or more web pages.

13. The method of claim 11, wherein the predefined cumulative value is at least one of a value reached after a predefined time period or a value reached after a predefined number of tokens are issued.

14. A system for transferring ownership of an asset over a network, comprising:
one or more client stations where participants interface with the network using one or more wired or wireless devices;
a server station that issues tokens having pre-defined values to the participants over the network, wherein each issued token is associated with a participant;
a processor that probabilistically selects at least one token upon or after a the total cumulative value of the issued tokens reaches a predefined cumulative value, wherein the processor performs a function related to transferring ownership right to the asset to a participant who is associated with the probabilistically selected token.

15. The system of claim 14, wherein the value for the asset corresponds to the predefined cumulative value of the issued tokens.

16. The system of claim 15, wherein the value for the asset is equal to the predefined cumulative value of the issued tokens.

17. The system of claim 14, wherein the tokens are issued in response to a participant purchasing the tokens for a specified price.

18. The system of claim 14, wherein the tokens are issued in response to a participant meeting an incentive criterion.

19. The system of claim 18, wherein the incentive criterion requires browsing one or more web pages.

20. The system of claim 14, wherein the asset is offered for sale over the network by specifying an asset value; and wherein the ownership right to the asset is transferred from a seller to a buyer participant who is associated with the probabilistically selected token.

21. The system of claim 14, wherein the asset is offered as a promotional item by specifying a corresponding incentive criterion for the promotional item, wherein the server station issues tokens to participants that meet the incentive criterion; and wherein the ownership right to the promotional item is transferred to a participant who is associated with the probabilistically selected token.

22. The system of claim 21, wherein the incentive criterion requires browsing one or more web pages.

23. The system of claim 14, wherein the predefined cumulative value is at least one of a value reached after a predefined time period or a value reached after a predefined number of tokens are issued.

* * * * *